3,533,658
VEHICLE SEAT
Otto Gropp, 43 Karlstrasse, 7101 Frankenbach,
near Heilbronn, Baden-Wurttemberg, Germany
Filed Apr. 3, 1968, Ser. No. 718,397
Claims priority, application Germany, Apr. 4, 1967,
G 49,730; Switzerland, Mar. 22, 1968, 4,343/68
Int. Cl. A47c 3/00
U.S. Cl. 297—355                                    16 Claims

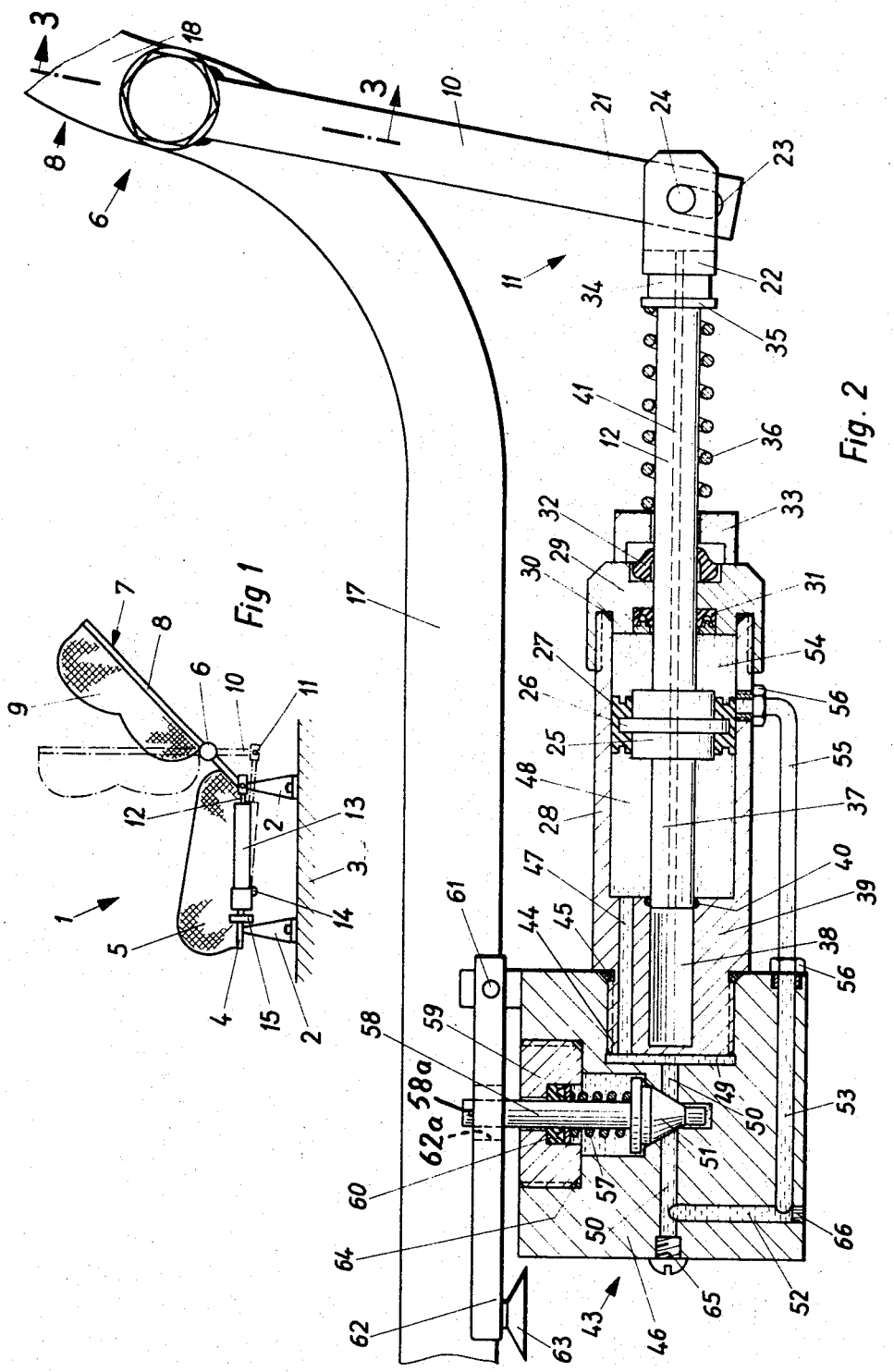

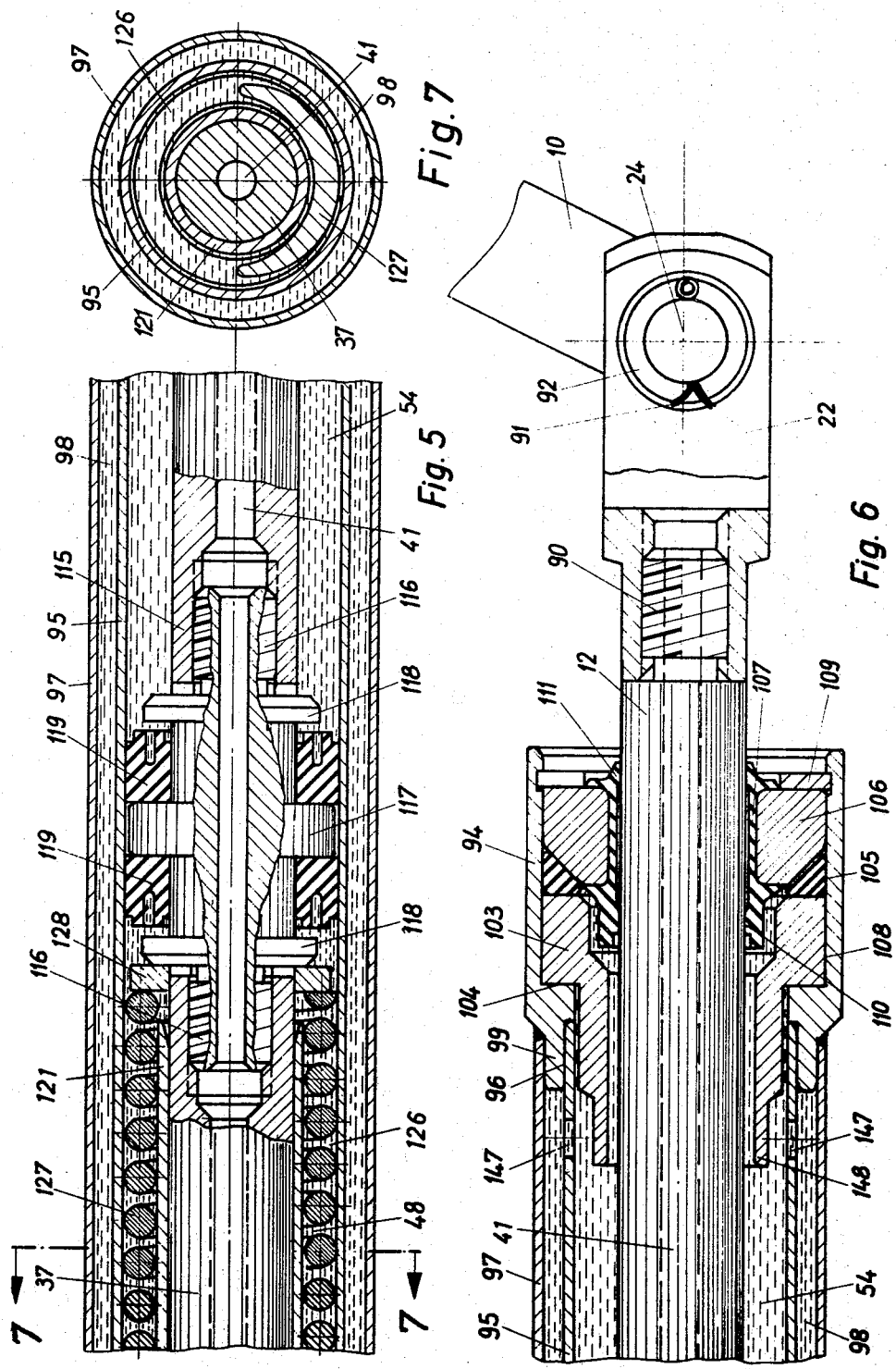

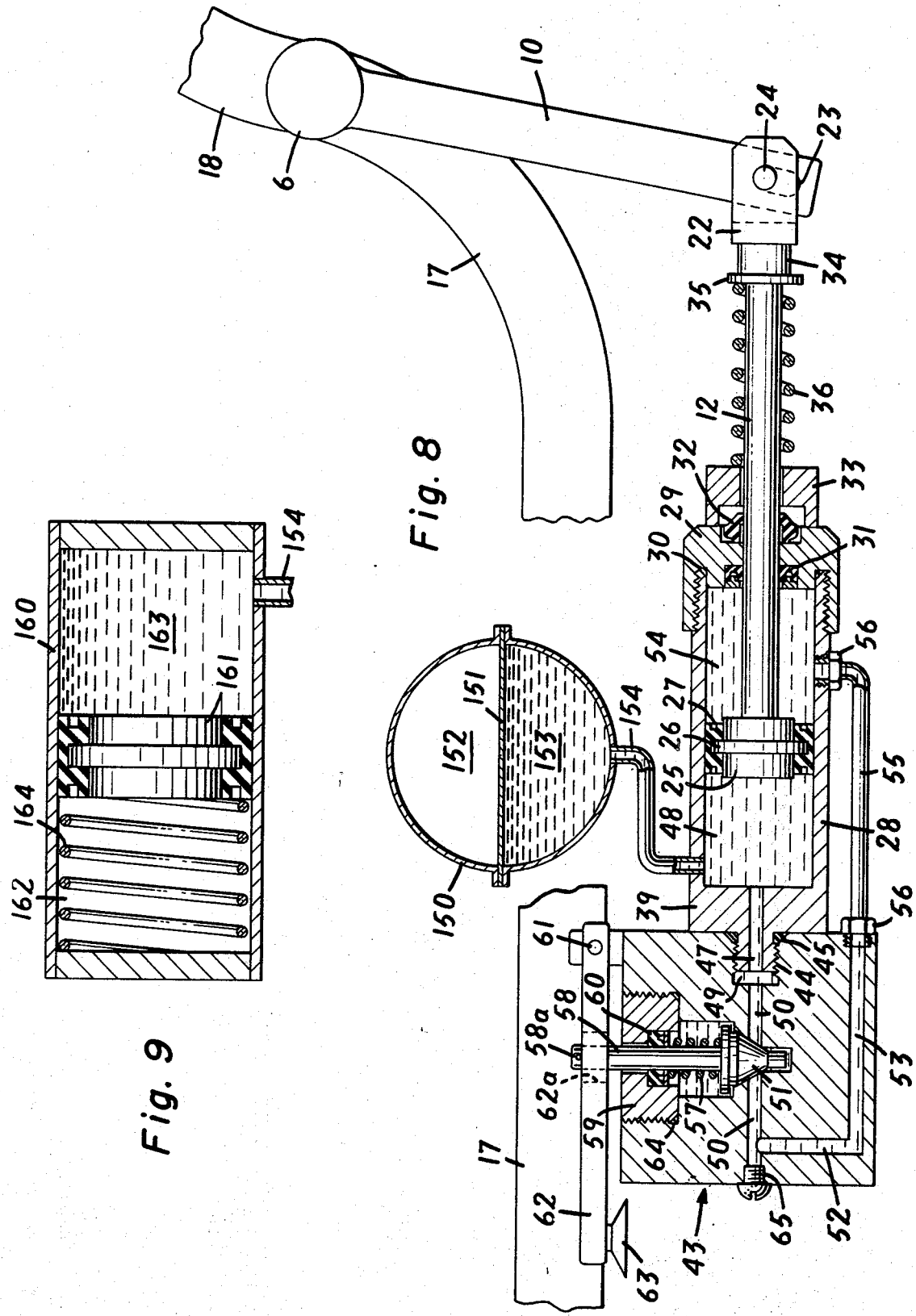

ABSTRACT OF THE DISCLOSURE

A vehicle seat is provided with a tiltable seat back which is held in selected position by a hydraulic cylinder having chambers on opposite sides of a piston filled with an incompressible fluid medium and connected with one another through a control valve which is manually opened to permit flow of fluid from one chamber to the other and thereby permit movement of the seat back and is closed to interrupt flow of fluid and thereby hold the seat back in position. The two chambers are preferably of equal cross section so that upon movement of the piston, the increase of volume of one chamber equals the decrease of the other. The seat back is biased toward a forward position. The flow of fluid from one chamber to the other is preferably attenuated so as to prevent movement of the seat too rapidly.

---

The invention relates to a vehicle seat or chair, in particular a bus seat, which is provided with an adjustable back that can be fixed in any desired position and is biased toward its forward position.

Seats of this kind which are used on all kinds of vehicles, particularly on buses and also on other vehicles such as trains and airplanes, where it is desirable to have an adjustable back rest which can be secured in adjusted position, for example by locking means which operates either stepwise or by clamping a slidable rod or the like so as to provide continuous or "stepless" adjustment. The seat back can thereby be adjusted from a vertical or nearly vertical position to a horizontal or nearly horizontal position as desired. In order to adjust the seat back rearwardly, the occupant disengages the locking means and presses the seat back rearwardly with his weight. When the desired position has been reached, he frees the locking means which thereupon automatically secures the seat back in adjusted position. When the occupant wishes to move the seat back forwardly, he disengages the locking mechanism and permits the seat back to be moved forwardly by the force of a spring provided in the adjusting mechanism. It has been found that step-by-step adjustment is not wholly satisfactory and that the continuously adjustable clamping mechanisms wear out relatively quickly and no longer function satisfactorily. Moreover, they are often heavy and hard to operate.

In accordance with the invention, an adjustable seat for vehicles and the like is provided with adjusting mechanism which is of compact enclosed construction and operates easily and reliably. The locking mechanism comprises a hydraulic cylinder filled with an incompressible fluid medium and having chambers on opposite sides of the piston connected with one another by a valve controlled passageway. There is thus provided hydraulic adjustment and locking of the seat back. Through the use of an incompressible fluid and the closing of the connection between the chambers, the volume of at least one of the two chambers cannot be varied so that the piston is held absolutely fast. The hydraulic locking mechanism can readily be installed on the seat in different positions since it is necessary merely to connect the cylinder and the piston rod with a support and the back rest respectively. The arrangement can readily be suited to the size and configuration of the seats and the desired angle of adjustment of the seat back. The hydraulic locking mechanism can be actuated by a very small force. It practically never wears out and can, when desired, be actuated from any desired position since the control valve may be connected with the cylinder through thin and, if desired, flexible tubing.

A further feature of the invention is that the pressure chambers on both sides of the piston are preferably of equal cross sectional area so that upon movement of the piston, the increase of volume of one chamber equals the decrease of the other. When the valve is closed, the chambers on both sides of the piston are kept at constant volume so that a still better locking action is obtained. The equalization of the cross sectional area of the chambers on opposite sides of the pistons is obtained by providing piston rods of the same cross section on opposite sides of the piston. One of the piston rods is connected to the back rest. In order to provide for free movement of the piston, a space for receiving the piston rod which is not connected to the chair back is vented to the atmosphere by means of a passageway extending axially through both of the piston rods.

If, according to another feature of the invention, one of the chambers of the cylinder is connected to an elastic accumulator, it is not necessary to use the second connecting rod for equalizing the pressure chambers. Moreover, the return spring for biasing the seat back forwardly can be replaced or supplemented by an elastic accumulator. The elastic accumulator may comprise a gas filled chamber provided with a membrane or with a floating piston or also a spring loaded piston in a cylinder or the like.

A favorable construction which is smooth and compact and free of exposed parts is provided by arranging a spring of desired strength in the cylinder so as to act between a cylinder head and the piston in a direction to bias the seat back forwardly. When the piston is provided with a second piston rod for equalizing the cross sectional areas of the chambers on opposite sides of the piston, the spring may conveniently be a helical spring surrounding one of the piston rods.

A particularly compact arrangement is provided when the cylinder and control valve are formed as a single unit. The construction and installation of the mechanism is thereby simplified. The control valve is, for example, arranged on the forward end of the cylinder and the connecting passageways between the valve are all enclosed in the unit. It is particularly advantageous to form the cylinder of thin tubing which is surrounded by an outer protecting tubing which protects the main cylinder tubing from damage and also provides an annular space between the two tubes for use as a passageway for connecting one of the cylinder chambers with a control valve mounted on an end of the cylinder.

The adjustment and locking hydraulic cylinder is advantageously located under one side of the seat or seat cushion so that there is no loss of room in the seat width and the mechanism is in a position for convenient operation. It is then not necessary to have any long conduits between the valve and the cylinder and a valve unitary with the locking mechanism is in a position for convenient operation by an occupant of the seat.

The nature and advantages of the invention will be more fully understood from the following description in conjunction with the accompanying drawings which shown by way of example preferred embodiments of the invention and in which:

FIG. 1 is a schematic side view of a seat having a tiltable back rest provided with hydraulic locking mechanism.

FIG. 2 is a schematic longitudinal section through a hydraulic cylinder provided with a valve, with neighboring portions of the seat frame and the back rest shown in side elevation.

FIGS. 4, 5 and 6 are together a longitudinal section of the cylinder of another example of hydraulic locking mechanism, FIG. 4 comprising the left hand portion including a valve, FIG. 5 showing a central portion containing a piston and FIG. 6 showing the right hand portion with the cylinder head.

FIG. 7 is a cross section through the cylinder along the line 7—7 in FIG. 5.

FIG. 8 is a view similar to FIG. 2 but showing a modification.

FIG. 9 is a schematic view illustrating a further modification.

Figure 3:
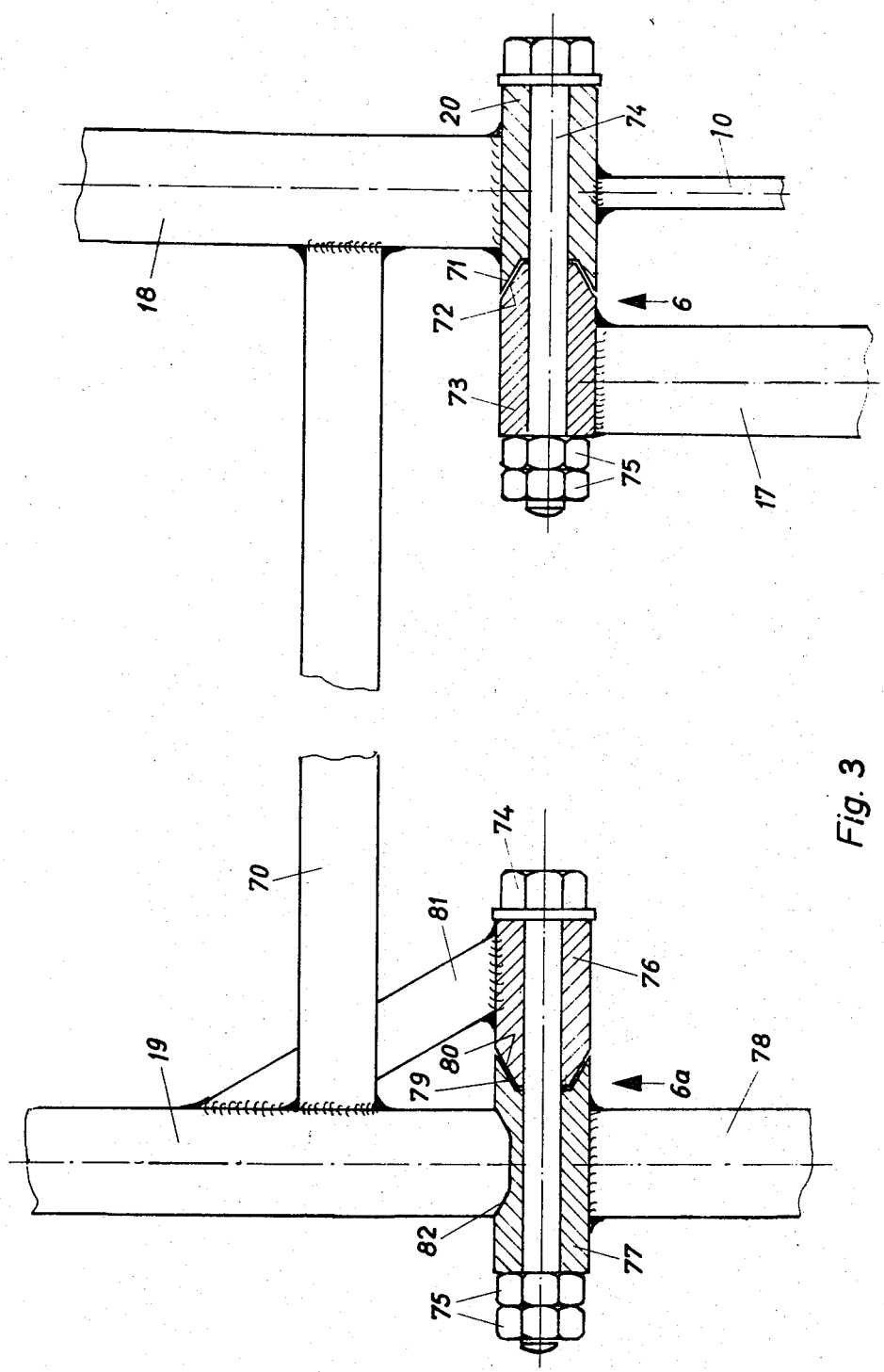
FIG. 3 is a cross section through the back rest bearings along the line 3—3 in FIG. 2.
Figure 4:
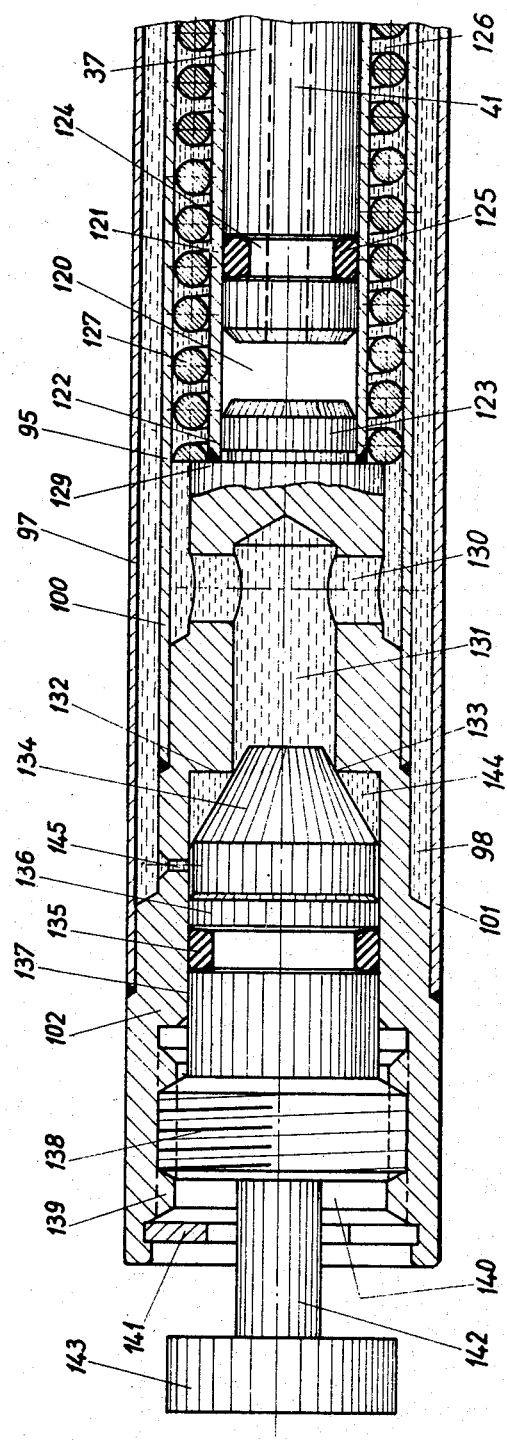

The bus seat 1 shown in FIG. 1 is secured to the floor 3 of the vehicle body by side feet 2. The seat frame 4 carries a seat cushion 5 and bearings 6 on which a back rest 7 is tiltingly supported in such manner as to be movable from a rearward position shown in solid lines in FIG. 1 to a forward position as shown in broken lines. The back rest 7 comprises a frame or support 8 and a back cushion 9. An actuating lever 10 secured to the back rest frame 8 and extending down below the bearings 7 is connected by means of a pivotal connection 11 to the piston rod 12 of a locking mechanism cylinder 13. The cylinder is supported on the seat frame 4 by a connection 14 and is provided at its forward end with a control valve actuating handle 15.

FIG. 2 shows in more detail a somewhat different embodiment of the locking mechanism cylinder and adjacent portions of the vehicle seat. A side tube 17 of the seat frame 4 is bent up at its rear end to support the back rest bearing 6. The back rest support 8 with tubular side frame members 18 and 19 is tiltably supported on the seat frame by bearings 6 and 6a (FIG. 3). An actuating lever 10 extends downwardly from a bearing member 20 at the lower end of the left back frame tube 18. The lower end of the actuating lever 10 is pivotally connected at 11 to the piston rod 12 of the locking mechanism cylinder 28. The connection is shown as being made by a forked head 22 on the end of the piston rod 12 which embraces the lower end portion 21 of the actuating lever 10. A pivot pin 24 extends through holes in the forked portion of the head 22 and an elongated hole 23 in the actuating lever.

The piston rod 12 carries a piston 25 which is sealed and guided in the cylinder 28 by a double packing ring 27 positioned by an annular projection 26 on the piston. The cylinder 28 is mounted by a suitable support or bracket (not shown) on the seat frame 4, for example on the tubular side member 17.

The rear end of the cylinder 28 is closed by a cylinder head shown in the form of a cap 29 which is screwed onto a threaded end portion of the cylinder and is made fluid tight by a packing 30. The cylinder head 29 is provided with an inner piston rod packing sleeve 31 and an outer grease ring 32 which is covered by a spring supporting cap 33. A helical resetting spring 36 surrounds the piston rod 12 and acts between the cap 33 and a support ring 35 spaced from the bifurcated head 22 by a spacer ring 34.

A second piston rod 37 extends forwardly from the opposite end of the piston 25. The piston rod 37 is of the same diameter as the piston rod 12 so that the effective faces at both ends of the piston 25 are the same and provide the same pressure areas. The piston rod 37 is received in a cylindrical recess 38 in the front end 39 of the cylinder. An O-ring 40 provides a seal between the front end of the cylinder and the second piston rod 37. The recess 38 is vented to the atmosphere by a bore 41 which extends longitudinal through both piston rods 37 and 12.

On the front end 39 of the cylinder 28, there is provided a control valve 43, the valve housing 46 of which is screwed directly onto a threaded extension 44 of the cylinder. A fluid tight joint is provided by an annular packing 45.

The piston 25 divides the cylinder 28 into a forward chamber 48 which increases in volume when the chair back is tilted forwardly and a rear chamber 54 the volume of which increases when the chair back is tilted rearwardly. A passageway 47 connects the forward chamber 48 of the cylinder 28 to a space 49 communicating with a valve passageway 50 which can be closed by a valve cone 51. On the opposite side of the valve cone 51, the valve passageway 50 is connected by a cross duct 52, connecting passageway 53 and tube 55 to the rear chamber 54 of the cylinder 28. The ends of the tube 55 are shown connected to the valve housing 46 and to the wall of the cylinder by screw couplings 56. The two chambers 48 and 54 of the cylinder 28 are thus connected with one another by a hydraulic circuit controlled by the valve 43. The hydraulic circuit is made fluid tight by a packing ring 64 for the screw cap 59, a closing screw 65 and a plug 66 in addition to the packings and seals previously described.

The valve cone 51 is biased by a helical compression spring 57 to a position in which it closes the valve passageway 50. The valve cone 51 is provided with a valve stem 58 which extends up through a screw cap 59 provided with a sealing ring 60. An upper end portion of the valve stem 58 extends through an opening 62a of an actuating lever 62, the rear end of which is pivotally connected at 61 to the valve housing. When the actuating lever 62 is swung upwardly about its pivot by means of a hand grip 63 provided at its forward end, the lever engages a transverse pin 58a at the upper end of the valve stem 58 so as to lift the conical valve member 51 against the action of spring 57 and thereby provide communication between the chambers 48 and 54 of the cylinder 28. The chambers 48 and 54 as well as the connecting passageways 47, 49, 50, 52, 53 and 55 are filled with an incompressible medium, for example hydraulic oil.

FIG. 3 illustrates the bearing supports of the seat back. Since the view is taken looking rearwardly as indicated by the section lines 3–3 in FIG. 2, the left hand portions of the seat appear at the right of the drawing and vice versa. The tubular side members 18 and 19 of the seat back are connected by a tubular transverse member 70. The left tubular member 18 (at the right of the drawing) carries at its lower end the bearing member 20 on which the downwardly extending actuating lever 10 is welded. The bearing member 20 is provided at its inner end with an inner cone 71 which engages an outer cone 72 of a bearing member 73 secured on the tubular side member 17 of the seat frame. The bearing members 20 and 73 are pressed together by a bolt 74 which extends through aligned holes in the bearing members and is provided with lock nuts 75. A similar arrangement of bearing members 76 and 77 is provided at the right side of the seat (shown at the left of the drawing) between the tubular side member 19 of the seat back and the tubular seat frame member 78. These bearing members are likewise provided with conical bearing surfaces and are drawn together by a bolt 74 provided with lock nuts 75. However, it is the bearing member 77 that is provided with the inner cone 79 while the bearing member 76 is provided with the outer cone 80. Moreover the bearing member 76 is welded on an inclined strut 81 which is welded on one side of the tubular back frame member 19. The lower end of the member 19 is provided with a semi-cylindrical bearing surface 82 which engages the outer surface of the bearing member 77. The cones 71, 72 and 79, 80 of the bearings 6 and 6a are thus so arranged that upon loosening the nuts 75—which are arranged at the same ends of the corresponding bolts 74—the back rest 7 can be easily removed from the seat. Dismounting and possible repair of the seat are thereby facilitated. Through the offsetting of one of the back rest bearings inwardly, the locking mechanism cylinder can be located underneath one side of the seat cushion and the cylinder and piston rod can be arranged in the plane of one of the seat back members so as to provide a favorable mechanical arrangement.

Adjustment of the seat back and securing it in adjusted position is accomplished in the following manner. When no rearward force is exerted on the seat back and the control valve 43 is opened by means of the actuating lever 62, the seat back is moved forwardly, for example to the position shown in broken lines in FIG. 1, by the action of the resetting spring 36 exerting a rearward force on the arm 10. The piston 25 is thereby moved toward the right in cylinder 28 (FIG. 2) to cause fluid to flow from the chamber 54 through passageways 55, 53, 52, 50, 49 and 47 to the chamber 48 of cylinder 28. If the handle 62 is then released so that the valve member 51 is moved to closed position by spring 57, the seat back is locked in position since the liquid medium in the cylinder is incompressible. If it is desired to adjust the seat back to another position, for example the position shown in solid lines in FIG. 1, the control valve 43 is opened while exerting a rearward pressure on the seat back, for example by a person sitting in the chair leaning backwards so as to overcome the force of spring 36. The piston 25 is thereby moved toward the left so as to cause liquid to flow from the chamber 48 through passageways 47, 49, 50, 52, 53 and 55 to the chamber 54. When the chair back has been moved to the desired position, the handle 62 is released so as to allow the valve 43 to close. The seat back is thereupon held in adjusted position. It will be seen that in this manner the seat back 7 can be adjusted easily and quickly to any desired position and will be held securely in the selected position when the handle 62 is released. Moreover, the mechanism in accordance with the invention permits continuous adjustment by any desired amount rather than step-by-step adjustment such as is provided by some prior art mechanisms.

In FIGS. 4 to 7, there is shown another example of a hydraulic cylinder for locking a seat back in any desired adjusted position as has been described with reference to FIGS. 1 to 3. Like parts of the mechanism are designated by the same reference numerals.

The piston rod 12 is provided at its rear end with a threaded extension 90 which is screwed into the bifurcated connecting head 22 which is connected to the lower end of the actuating lever 10 of the seat back by means of a pivot pin 24. The pin 24 is secured by a washer 92 and cotter key 91.

The piston rod 12 extends through a cylinder head 94 into the rear chamber 54 of a cylinder which is here shown as a thin wall tube 95 which extends into a bore 96 of the cylinder head and is secured in place, for example by welding. The main cylinder tube 95 is surrounded by a somewhat larger concentric protecting tube 97 so as to provide an annular space 98 between the two tubes. The outer protecting tube 97 fits over an extension 99 of the cylinder head 94 and is suitably secured, for example by welding. The forward end 100 of the main cylinder tube 95 and the forward end 101 of the protecting tube 97 fit onto and are welded to a stepped cylindrical valve housing 102, the outer diameter of which equals the outer diameter of the tube 97. There is thus provided a closed, smooth, compact, space saving unit comprising the locking mechanism cylinder and control valve. This unit is suitably mounted on the seat structure, for example on the side tube 17 in such position that the valve conveniently be operated by an occupant of the seat.

In cylinder head 94 there is a bushing 103 which seats on a shoulder 104 and is held in place by an O-ring 105—which provides a seal—a retaining ring 106 and a snap ring 109. A piston rod sealing ring 107 is held in place by ring 160 and has an inner sealing lip 110 and an outer wiping lip 111 which insure that the cylinder chamber 54 is satisfactorily sealed and the piston rod 12 when it comes out is perfectly clean so that the occupant of the seat and also any clothing that may hang down will not be soiled.

A threaded extension 116 of the piston 117 is screwed into the left end 115 of the piston rod 112 with an interposed washer 118. On the left end of the piston 117 there is a similar threaded extension 116 on which an equalizing piston rod 37 is screwed, likewise with a washer 118. The left piston rod 37 slides in a receiver 120 formed by an inner cylindrical tube 121 the left end 122 of which is closed by a plug portion 123 of the valve housing 102 to which the cylinder 121 is welded. An O-ring 125 lying in an annular groove 124 in the equalizing piston rod 37 provides a seal with the inner tube 121. The receiver space 120 in the tube 121 is vented to the atmosphere by a vent bore 41 extending axially through the equalizing piston rod 37 the piston 117 and the piston rod 112 to the slit of the forked head 22.

In the forward chamber 48 a resetting spring 127 is arranged in the annular space 126 between the main cylinder 95 and the inner cylindrical tube 121. One end of the spring bears on a supporting ring 128 which encircles the right end of the equalizing piston rod 37 and seats on the washer 118. The other end presses against a shoulder 129 of the valve housing 102. The piston 117 is shown in almost its extreme left position so that the spring 127 is almost fully compressed. When the piston moves toward the right, the spring 127 expands over the equalizing piston rod 27 as the latter comes out of the inner cylindrical tube 121.

The forward chamber 48 formed by the annular space 126 between the main cylinder 95 and the inner cylindrical tube 121 is connected by a large cross bore 130 in the multiple stepped housing 102 with a central valve bore 131. At the forward end of the bore 131, a sharp corner 133 provided by a shoulder 132 provides a valve seat for a conical valve member 132 which is slidable in a guiding bore 137 with which a seal is made by an O-ring 135 received in an annular groove of a cylindrical portion 136 of the valve member. On the cylindrical part 136 of the valve member there is an externally threaded extension of somewhat larger diameter which screws into an inwardly threaded portion 139 of the valve housing bore 140. A snap ring 141 prevents the valve member from being screwed completely out of the valve bore. A central valve actuating shaft 142 extends axially outwardly from the valve member and is provided at its forward end with an actuating grip 143. The hand grip can be formed as a knurled knob or as a lever which projects laterally under the seat cushion 5 of the bus seat.

The valve chamber 144 in which the valve member 134 is located is connected by an attenuated choke bore 145 with the annular space 98 between the outer protecting tube 97 and the main cylinder 95. The choke bore 145 assures a gentle movement of the seat back. At the other end, in the vicinity of the cylinder head 94, the main cylinder wall 95 is provided with a connecting hole 147 which connects the annular space 98 with the rear chamber 54 of the main cylinder 95. To prevent the opening 147 from being obscured by the piston 117, movement of the piston toward the right is limited by an extension 148 on the bushing 103 which is engageable with the washer 118 on the rear side of the piston.

The chambers 48 and 54 on opposite sides of the piston 117, as well as the annular space 98, bores 130 and 131 and the valve chamber 144, are filled with an incompressible medium which preferably is hydraulic oil. As the piston rods 12 and 37 on opposite sides of the piston 117 have the same diameter, the effective areas of opposite ends of the piston 117 are the same so that movement of the piston produces equal changes in volume of chambers 48 and 54 on opposite sides of the piston.

When the valve member 134 is seated on the valve seat 133 and thus in closed position as shown in the drawings, the connection between the two chambers 48 and 54 on opposite sides of the piston 117 is interrupted so that the piston 117 and thereby the seat back 7 are held in fixed position. When the valve member 134 is unseated from the valve seat 133 by turning the hand grip 143, the spring 127 comes into action and, insofar as the seat back is not loaded, pushes the piston 117 toward the right so that fluid medium from the chamber 54 passes through the opening 147, the annular space 98 and choke bore 145, past the valve member 34 and through bores 131 and 130 into the annular space 126 of the left chamber 48 until the valve is closed through turning the hand grip 143 or until the washer 118 on the right hand side of the piston engages the extension 148 of the bushing 103. Conversely, when the valve is opened and when the piston 117 is not in its forwardmost position, the piston can be moved toward the left by a rearward pressure on the seat back so as to cause the hydraulic oil to flow slowly from the forward chamber 48 to the rear chamber 54 so that the seat back moves slowly rearwardly. The rate of movement of the seat back in either direction is restricted by the choke bore 145 so that the seat back does not move to rapidly.

This embodiment of the invention with three cylinders arranged one inside the other and with flow of fluid from one chamber to the other through the annular space between the main cylinder 95 and the protecting tube 97 has the important advantage of providing a safe, compact and responsive control unit. Any indentations or the like caused by objects striking the outer cylinder 97 do not interfere in any way with the smooth travel of the piston in the main cylinder 95 so that very thin wall tubing can be used.

Numerous variations can be made within the scope of the invention. For example a disk valve can be used in place of the cone valve. If desired, the valve can be separated from the cylinder and arranged in the arm rest of the bus seat. In this event, the valve is connected to the cylinder by suitable conduits. If desired, the locking mechanism cylinder can be arranged in or on the arm rest and directly connected with the back rest frame. Also instead of a metal spring, shown in the drawings as a helical compression spring, it is possible to use other means for biasing the seat back toward a forward position, for example rubber springs or air springs comprising gas filled rubber balls or a pneumatic cushion. Alternatively, the biasing means may comprise a gas chamber with a flexible membrane or a diaphragm. When a gas spring or a spring pressed floating piston is used for providing resetting movement of the seat back, it is not necessary to provide equal effective areas on opposite sides of the piston and hence the equalizing piston rod can be omitted. When a gas spring, for example an elastic accumulator, is used to provide the back pressure it is connected with the chamber which is enlarged upon forward movement of the seat back. This is the forward cylinder when the cylinder is connected with a lever extending downwardly from the seat back bearings as shown in the drawings and the rear chamber in the event the cylinder is connected with the seat back frame above the bearings. If any expansion means are provided for the incompressible medium, care must be taken that no gas can accumulate between the valve and either side of the piston since in that case satisfactory locking of the seat back in selected position cannot be obtained.

An example of a construction in which a gas spring in the form of an elastic accumulator is used as the biasing means is illustrated by way of example of FIG. 8. The construction of the embodiment shown in FIG. 8 is in general the same as that of FIG. 2 and like parts are designated by the same reference numerals so that the description need not be repeated. However, the embodiment of FIG. 8 differs from that of FIG. 2 in that the second piston rod 37 is omitted and the forward chamber 48 of the cylinder 28 is connected to an elastic accumulator 150. The accumulator is illustrated schematically in the drawing as comprising a hollow spherical body divided by a rubber or other flexible membrane or diaphragm 151 into a closed gas chamber 152 and a liquid chamber 153 connected by a passageway 154 to the chamber 48. By reason of the space occupied by the piston rod 12, the cross sectional area of the rear chamber 54 of cylinder 28 is smaller than the cross sectional area of the forward chamber 48. Hence when the piston 25 is moved forwardly by rearward pressure on the seat back with the valve 43 open, the volume of chamber 48 is decreased by an amount greater than the volume of chamber 54 is increased. Hence a portion of the liquid displaced from chamber 48 flows through passageways 50, 52, 53 and 55 to chamber 54 while another portion flows through passageway 154 to the elastic accumulator 150, thereby forcing the diaphragm 151 upperwardly and further compressing the gas in chamber 152. It will thus be seen that the gas under pressure in chamber 152 serves as elastic means tending to move the piston 25 rearwardly and thereby move the seat back forwardly. The elastic accumulator 150 thus supplements the action of the resetting spring 36. If the restoring force of the elastic accumulator 150 is sufficiently large to move the seat back to its forward position, the spring 36 can be omitted.

In FIG. 9 there is schematically illustrated a modification in which the elastic accumultator 150 of spherical form is replaced by an accumulator in the form of a cylinder 160 divided by a floating piston 161 into an air chamber 162 and a liquid chamber 163 which is connected by a passageway 154 to the forward chamber 48. A coil compression spring 164 in chamber 152 tends to move the piston toward the right. The accumulator works in the same manner as that of FIG. 8. When liquid is forced from the chamber 48 of the locking cylinder 28 (FIG. 8) the floaitng piston 161 is moved toward the left against the elastic resistance of the coil spring 164 and any air or gas trapped in chamber 162. If the chamber 162 is sealed and contains air or other gas under sufficient pressure to supply the elastic force needed for the accumulator, the spring 164 may be omitted. It will be recognized by those skilled in the art that many other modifications may be made for example in the kind of valve used, the shape of the piston and the piston packing rings, etc.

What I claimed is:

1. A vehicle seat having an adjustable back rest which is tiltable forwardly and rearwardly about bearings near the lower side of said back rest means for biasing said seat forwardly and means for locking said back rest in any desired position, said locking means comprising a hydraulic cylinder filled with incompressible fluid and a piston working in said cylinder, said cylinder and piston being connected one to a stationary support and the other to said back rest and said piston dividing said cylinder into two chambers on opposite sides of the piston, the volume of one of said chambers being increased and the volume of the other of said chambers being decreased by movement of the piston in one direction and fluid flow means for connecting said chambers with one another, said connecting means comprising a manually controlled cutoff valve, said chambers being in communication with one another when said valve is open to permit movement of said piston and thereby permit movement of said back rest, and at least one of said chambers being closed so as to be held at constant volume when said valve is closed to immobilize said piston and thereby lock said back rest against movement, said bearings for tiltably supporting said back rest comprising two bearings at opposite sides of the seat, the bearing on that side of the seat where said cylinder is located being offset inwardly from the corresponding side of the back rest to permit location of said cylinder approximately in line with a side frame member of said back rest said chambers are of equal cross sectional area whereby, upon movement of the said piston, the volume of the said chamber is increased by the same amount that the volume of the other of the said chamber is decreased.

2. A vehicle seat according to claim 1, in which said piston is provided on opposite sides with piston rods of the same diameter, one of said piston rods being connected with said back rest.

3. A vehicle seat according to claim 2, in which said piston rod which is not connected with said seat back is received in an inner cylindrical tube which is vented to the atmosphere, a fluid seal being provided between said piston rod and said inner cylindrical tube.

4. A vehicle seat according to claim 1, in which one of said chambers of said cylinder is connected with an elastic accumulator.

5. A vehicle seat according to claim 4 in which said elastic accumulator is connected with the chamber the volume of which is increased upon movement of the back rest forwardly.

6. A vehicle seat according to claim 1, in which the means for biasing the back rest forwardly comprises a metal spring.

7. A vehicle seat according to claim 6, in which said spring is a helical compression spring surrounding the piston rod connected with said back rest and acting between an end of the cylinder and means for connecting said piston rod with the back rest.

8. A vehicle seat according to claim 6, in which said spring comprises a helical compression spring inside said cylinder and acting between an end of the cylinder and said piston.

9. A vehicle seat according to claim 8, in which two piston rods extend from opposite ends of said piston, one of said piston rods being connected with said back rest, an inner cylinder tube disposed coaxially in said cylinder receiving the other of said piston rods, and in which said compression spring is a helical spring surrounding said other piston rod and said inner cylindrical tube.

10. A vehicle seat according to claim 1, in which said cylinder and valve comprise a single constructional unit.

11. A vehicle seat according to claim 10, in which an outer cylindrical casing surrounds said cylinder with a space therebetween and in which said connection between said chambers includes said space.

12. A vehicle seat according to claim 11, in which said valve comprises a cylindrical valve housing which is fixed on the ends of said cylinder and said casing, and is of at least approximately the same diameter as said casing.

13. A vehicle seat according to claim 10, in which said unit comprising said cylinder and valve is disposed under a side portion of the seat with said valve at the forward end of said cylinder in convenient position for actuation of said valve by an occupant of said seat.

14. A vehicle seat according to claim 1, in which the bearings for tiltably supporting said back rest comprise two bearings at opposite sides of said seat, each of said bearings comprising a bearing member on a stationary part of the seat and a bearing member on the back rest, said bearing members having interengaging conical bearing surfaces and aligned axial bores and a bolt extending through said bores to hold said bearing members together, both of said bearing members on said back rest being on the same side of said bearing members on said stationary part, whereby when said bolts are loosened, the back rest can be easily removed.

15. A vehicle seat according to claim 1, in which said back rest comprises a frame having tubular side members, and a downward extension of one of said side members below said bearings, said cylinder-and-piston locking means being connected to said downward extension.

16. A vehicle seat according to claim 1, in which said connecting means between said chambers comprises a restricted passageway which attenuates the flow of fluid from one chamber to the other and thereby limits the rate of movement of said back rest.

References Cited

UNITED STATES PATENTS

| | | |
|---|---|---|
| 1,538,675 | 5/1925 | Chappell et al. |
| 1,711,565 | 5/1929 | Hatfield _____ 60—53 |
| 2,060,220 | 11/1936 | Kennedy _____ 60—53 |
| 2,391,492 | 12/1945 | Turchan et al. |
| 2,217,783 | 10/1940 | Bell _____ 269—325 |
| 2,520,455 | 8/1950 | Clachko _____ 269—325 |
| 3,004,812 | 10/1961 | Miller _____ 269—323 |
| 3,024,067 | 3/1962 | Brandoli _____ 297—355 |
| 3,150,898 | 9/1964 | Knudson _____ 297—361 XR |
| 3,241,828 | 3/1966 | Adolphson et al. _____ 269—325 |

JAMES T. McCALL, Primary Examiner

G. O. FINCH, Assistant Examiner